(12) United States Patent
Esandi Murguialday

(10) Patent No.: US 11,465,600 B2
(45) Date of Patent: Oct. 11, 2022

(54) ADJUSTABLE BRAKE PEDAL SIMULATOR DEVICE

(71) Applicant: ZF Active Safety US Inc., Livonia, MI (US)

(72) Inventor: Mikel Esandi Murguialday, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 307 days.

(21) Appl. No.: 16/670,341

(22) Filed: Oct. 31, 2019

(65) Prior Publication Data

US 2021/0129814 A1    May 6, 2021

(51) Int. Cl.
*B60T 8/40* (2006.01)
*B60T 13/74* (2006.01)
*B60T 7/04* (2006.01)

(52) U.S. Cl.
CPC .............. *B60T 8/409* (2013.01); *B60T 7/042* (2013.01); *B60T 8/4086* (2013.01); *B60T 13/745* (2013.01)

(58) Field of Classification Search
CPC ........ B60T 8/409; B60T 8/4086; B60T 7/042; B60T 13/745
See application file for complete search history.

(56) References Cited

U.S. PATENT DOCUMENTS 9,387,836 B2    7/2016  Ryu
2016/0160892 A1*  6/2016  Schepp ............... F15B 15/1428
                                          92/85 A

FOREIGN PATENT DOCUMENTS

DE    102014215065 A1 *  2/2016  .............. B60T 8/409
DE    102015200016 A1 *  7/2016  ............ B60T 11/236

* cited by examiner

*Primary Examiner* — Xuan Lan Nguyen
(74) *Attorney, Agent, or Firm* — Robert James Harwood

(57) ABSTRACT

A pedal simulator connected to a master cylinder to provide brake pedal response to a driver. The pedal simulator includes first and second reaction force members with an adjustable gap to change brake pedal feeling. A component of the pedal simulator includes a deformable portion that is used to adjust the gap to achieve a desired brake pedal response.

19 Claims, 5 Drawing Sheets

ADJUSTABLE BRAKE PEDAL SIMULATOR DEVICE

BACKGROUND OF THE INVENTION

In electronic brake systems a pedal simulator provides a brake pedal response to the driver at the time of braking. The pedal simulator is designed to provide reaction forces to the driver similar to those created in conventional brake systems. In a brake system incorporating a pedal simulator, when a driver pushes the brake pedal during normal braking, the pedal simulator provides a reaction force to the brake pedal using a biased member to absorb forces to simulate a brake pedal response in a desired manner. However, a single biased member typically provides a generally linear pedal feeling and may not provide a driver desired pedal feeling. Thus, a plurality of staged biased members and other means can be provided to vary the pedal feeling along the travel of the brake pedal.

Pedal simulators are comprised of a variety of components assembled into a finished product. Each component has various tolerances that are acceptable as a result of the manufacturing process. As the tolerances of the various biased members and other components of the pedal simulator can have a range of tolerances, the brake pedal feeling to the driver from one pedal simulator to another with identical components can vary.

SUMMARY OF THE INVENTION

The invention relates to a pedal simulator which is capable of providing brake pedal response with a specific brake pedal feel to the driver.

It is also another aspect of the present invention to provide a pedal simulator which is capable of providing various pedal response by controlling or correcting for varying tolerances.

Another aspect of the present invention is to utilize one adjustable component for a variety of different brake pedal responses.

It is an aspect of the present invention to provide an adjustable onset brake pedal feel by selectively changing a gap in a pedal simulator configured to provide pedal response to a driver.

It is another aspect of the present invention to provide a deformable portion of the pedal simulator for selectively adjusting a gap in the pedal simulator.

It is another aspect of the invention that a gap in the pedal simulator can be selectively adjusted in response to the dimensions of other components in the pedal simulator.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
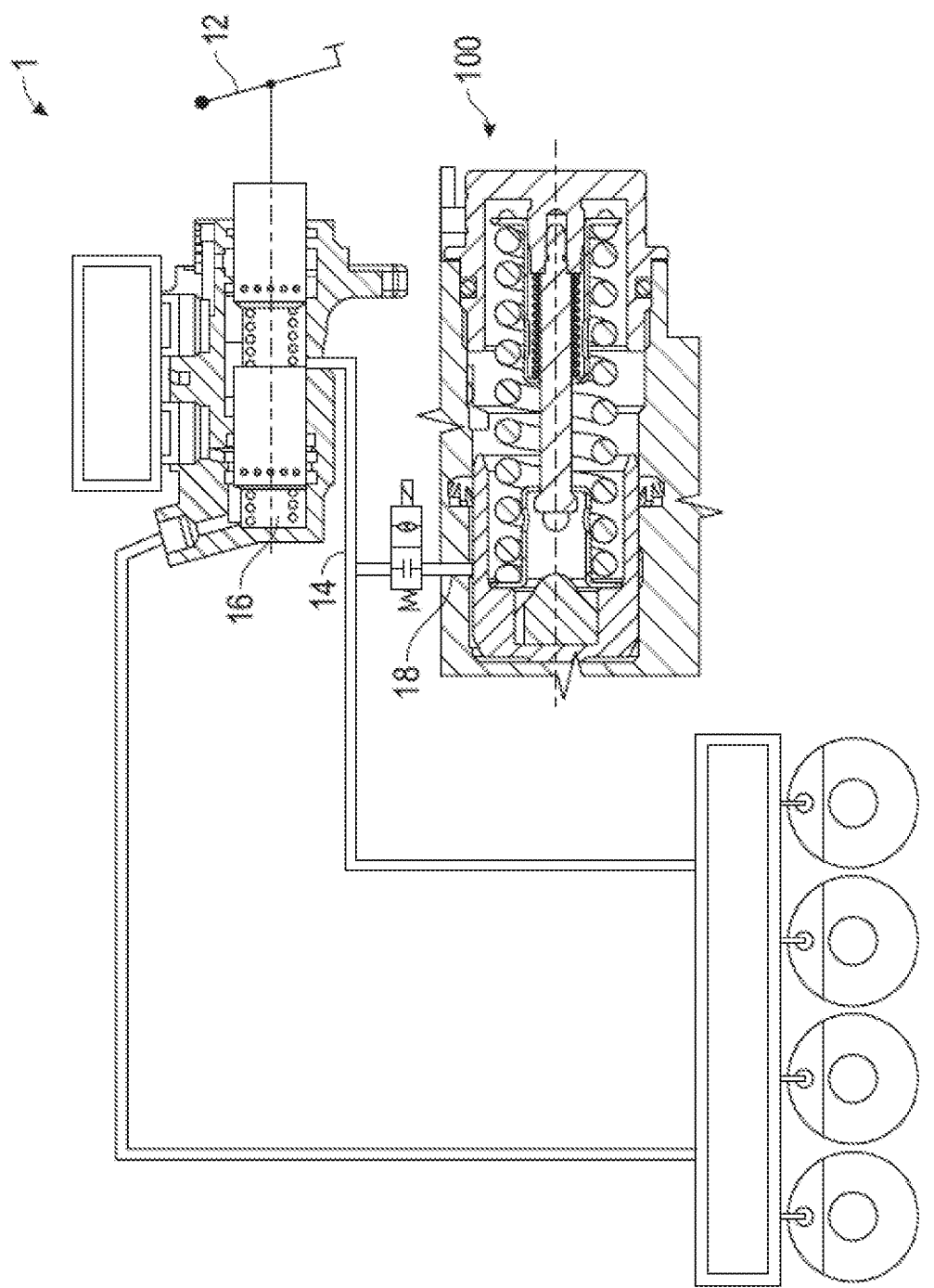
FIG. 1 is a view illustrating a brake system for a vehicle including a pedal simulator.

Referring now to the drawings, there is illustrated in FIG. 1 braking system for a vehicle 1 including a pedal simulator 100 according to a first exemplary embodiment of the present invention. When a driver pushes the brake pedal 12 during a normal braking operation, the pedal simulator 100 provides a reaction force to the brake pedal 12, which is transmitted via a hydraulic connection 14 between a master cylinder 16 and the pedal simulator 100, to simulate the hydraulic connection to the wheel brakes in a conventional braking system. As shown in FIG. 1, the driver pressing on the brake pedal 12 will advance the master cylinder 16 so as to force fluid from the master cylinder 16 into the hydraulic connection 14. Brake fluid in the hydraulic connection 14 will then enter into the pedal simulator 100, during a normal braking operation, via an aperture 18 to pressurize a portion of the pedal simulator 100 and provide reaction forces to the brake pedal 12 the driver. The reaction forces created by the pedal simulator 100 are generated in a manner further described below.

Figure 2:
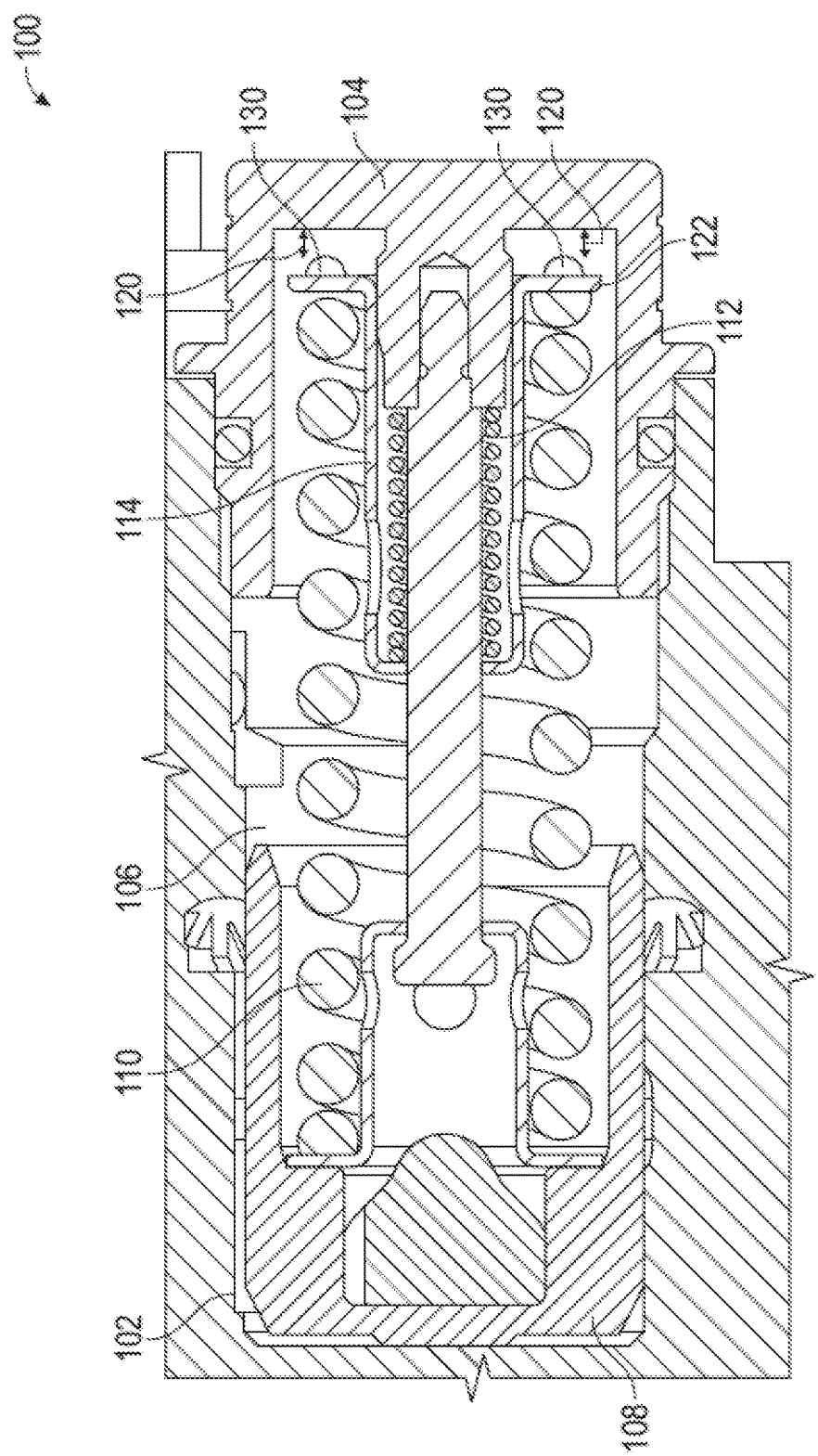
FIG. 2 is a view illustrating a pedal simulator device in an initial pedal simulator state, according to a first exemplary embodiment of the present invention.

Referring now to FIG. 2, the pedal simulator 100 according to a first embodiment of the invention is generally housed within a bore 102, having a first end portion, and enclosed by a simulator cap 104, having a second end portion defining an enclosure 106. However, it is within the scope of the invention that the enclosure 106 of the pedal simulator 100 may be formed from a housing, container, or other space having a first end portion and a second end portion configured to house the components of the pedal simulator 100. At least a portion of the enclosure 106 will be pressurized via brake fluid coming from the master cylinder. Pressurization of at least a portion of the enclosure 106, such as a first portion of the enclosure, will cause movement of a plunger portion 108 of the pedal simulator 100. One or more biased elements, such as a first reaction spring 110 and a second reaction spring 112, oppose movement of the plunger portion 108 In the illustrated embodiment, the first reaction spring 110 is located between the plunger portion 108 and a spring retainer 114, while the second reaction spring 112 is located between the spring retainer 114 and the simulator cap 104. The biased forced created by the first 110 and second 112 reaction springs produce the reactionary forces felt by the driver pressing on the brake pedal 12, in the manner described below.

Hydraulic pressure is increased in the pedal simulator 100 by the driver advancing the brake pedal 12, which in turn causes the master cylinder to force additional brake fluid into the pedal simulator 100. As such, the plunger portion 108 moves laterally in the pedal simulator 100. As the plunger portion 108 moves laterally, the first reaction spring 110 is also moved laterally which in turn moves the spring retainer 114. As shown in FIG. 2, a gap 120 is provided between the spring retainer 114 and the simulator cap 104. However, it is within the scope of the invention that the gap 120 may be between the spring retainer 114 and a second end of the enclosure 106. The gap 120 allows an initial movement of the spring retainer 114 relative to the simulator cap 104. Thus, the initial movement of the spring retainer 114 forces compression of the second reaction spring 112 between the spring retainer 114 and the simulator cap 104. As such, the primary reaction force from the pedal simulator 100 is a function of the properties of the second reaction spring 112. Compression of the second reaction spring 112 will continue until the spring retainer 114 advances far enough laterally in the pedal simulator 100 to overcome the gap 120 and abut the simulator cap 104 or a second end of the enclosure. Once the spring retainer 114 abuts the simulator cap 104, the primary reaction force in the pedal simulator 100 is a function of the properties of the first reaction spring 110.

Figure 4:
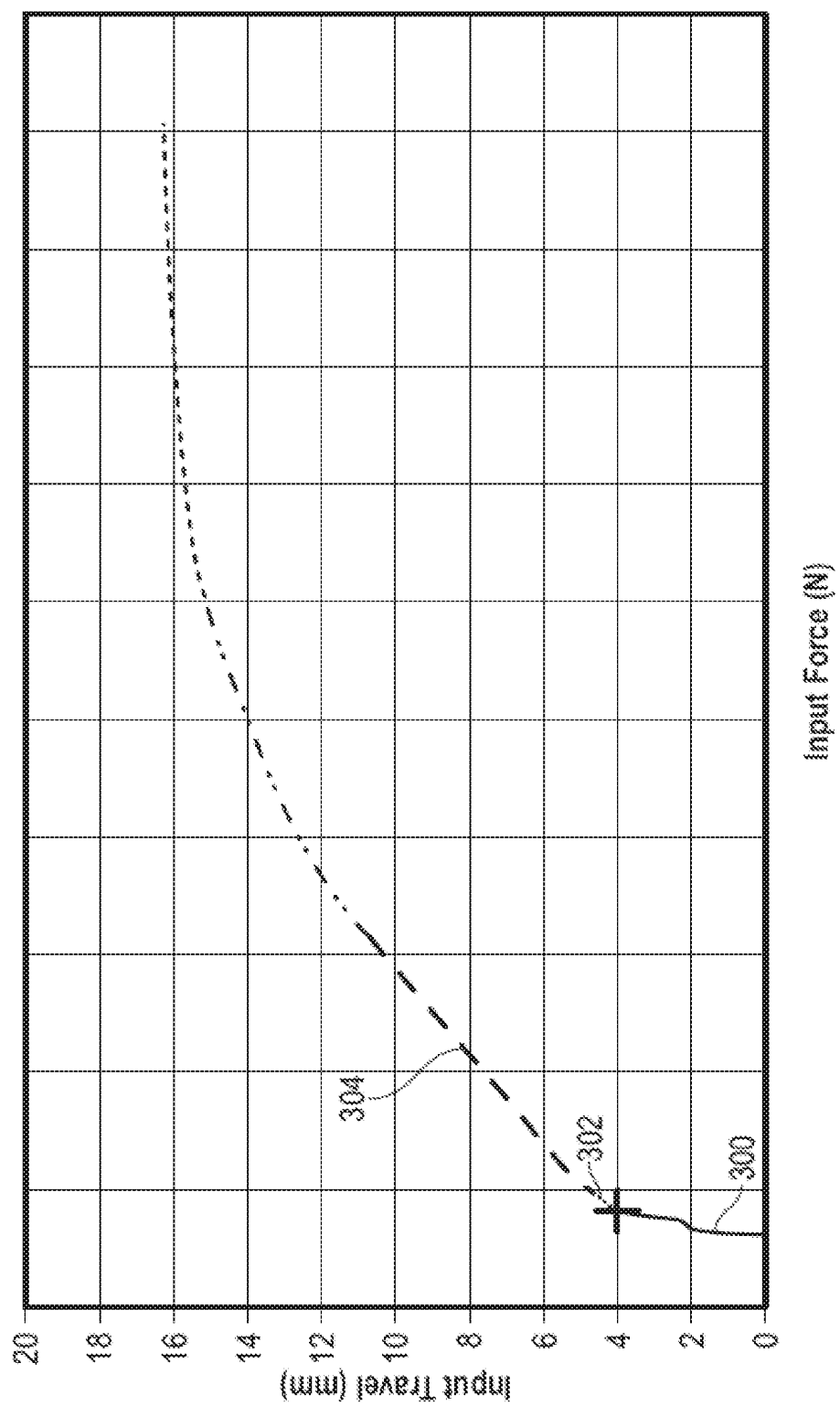
FIG. 4 is a graph illustrating a relationship between brake pedal input travel and brake pedal input force according to an exemplary embodiment of the present invention.

FIG. 4 graphs the input travel of the brake pedal 12 relative to the input force of the brake pedal 12 with the pedal simulator 100 providing a reaction force to the brake pedal 12. As previously described, the second reaction spring 112 is the primary reaction force until the spring retainer 114 and the simulator cap 104 abut one another. In the shown embodiment of FIG. 2, the second reaction spring 112 has a weaker spring reaction force relative to the first reaction spring 110. As such, the brake pedal 12 will travel a further distance for a given force during compression of the second reaction spring 112 relative to the first reaction spring 110. A first reaction force period 300, corresponding to an initial pedal simulator state and initial pedal travel feel, is graphed on FIG. 4, showing a generally linear correlation of input force in relation to brake pedal 12 input travel. Further, the slope of the line indicates a small amount of input force resulting in a larger input travel corresponding to the reaction forces of the second reaction spring 112. FIG. 4 then illustrates an onset braking point 302 that corresponds to when the spring retainer 114 contacts the simulator cap 104, corresponding to an actuated pedal simulator state. The onset braking point 302, a predetermined transition point, where the first reaction force period 300 switches to the second reaction force period 304. As shown in FIG. 4, the second reaction force period 304 has a slope indicating a greater input force required to move the brake pedal 12 a given travel distance, relative to the first reaction force period 300. In the second reaction force period 304, the slope of the line indicates the reaction force characteristics of the first reaction spring 110.

As demonstrated in FIG. 4, the location of the onset braking point 302 along the input travel vs input force curve determines the brake pedal feel characteristics for a driver. While the relationship between the input force and the brake pedal travel, corresponding to the slope of the line in the first reaction force period 300 and the second reaction force period 304, is determined by the spring characteristics of the first reaction spring 110 and the second reaction spring 112, the onset braking point 302 is determined by the gap 120 between the spring retainer 114 and the simulator cap 104. Thus, the gap 120 must be adjusted for a desired brake pedal response to the driver. However, the desired brake pedal response may vary from one application to another. Thus, an adjustable means for setting the dimensions of gap 120 is desired without creating a large part catalog from a specific component being created for a specific application.

As shown in FIG. 2, a gap protrusion 130 is located on the spring retainer 114. More specifically in the embodiment of FIG. 2, the gap protrusion 130 is located on a spring retainer flange 122, wherein the spring retainer flange 122 is configured to retain the first reaction spring 110. The gap protrusion 130 also defines the surface closest to the simulator cap 104, and thus will be the first surface to come into contact with the simulator cap 104.

In the embodiment shown in FIG. 2, the gap protrusion 130 is integrally formed with the spring retainer 114. However, it is within the scope of the invention that the gap protrusion 130 could be formed as a separate component or could be secured to the spring retainer 114. In the embodiment shown in FIG. 2, the gap protrusion 130 is formed from metal in the shape of a dome, but could be made of any desired material or formed in any desired shape. Further, it is within the scope of the invention that the gap protrusion 130 can be made in a variety of ways from the spring retainer 114. For example, the gap protrusion 130 can be formed by a stamping operation performed on the spring retainer 114, such that the stamping operation deforms a portion of the spring retainer 114 to protrude from the remainder of the spring retainer. It is also within the scope of the invention that the gap protrusion 130 could be formed from casting or a machining operation. In addition to the gap protrusion 130 having a variety of shapes, the gap protrusion 130 can be formed as a continuous ring around the spring retainer 114, or formed as a plurality of individual protrusions spaced around the spring retainer 114. Further, the gap protrusion 130 could be any continuous shape, for example a square, triangle, circle, oval, or any polygon or can have individual protrusions of any shape or any combination of shapes.

With a gap protrusion 130 located on the spring retainer, in the embodiment shown in FIG. 2, the gap protrusion 130 will have an initial height from its formation process. In order to adjust the pedal feeling by changing the dimensions of the gap 120, as described above, the height of the gap protrusion 130 can be adjusted to a plurality of heights to change the distance between the simulator cap 104 and the spring retainer 114, via the outermost surface of the gap protrusion 130. In the preferred embodiment, the gap protrusion 130 is set to a specific height via a crushing operation that deforms the gap protrusion 130 to the desired height. However, it is within the scope of the invention that the height of the gap protrusion 130 can be adjusted via any method such as a machining or cutting operation.

Figure 3:
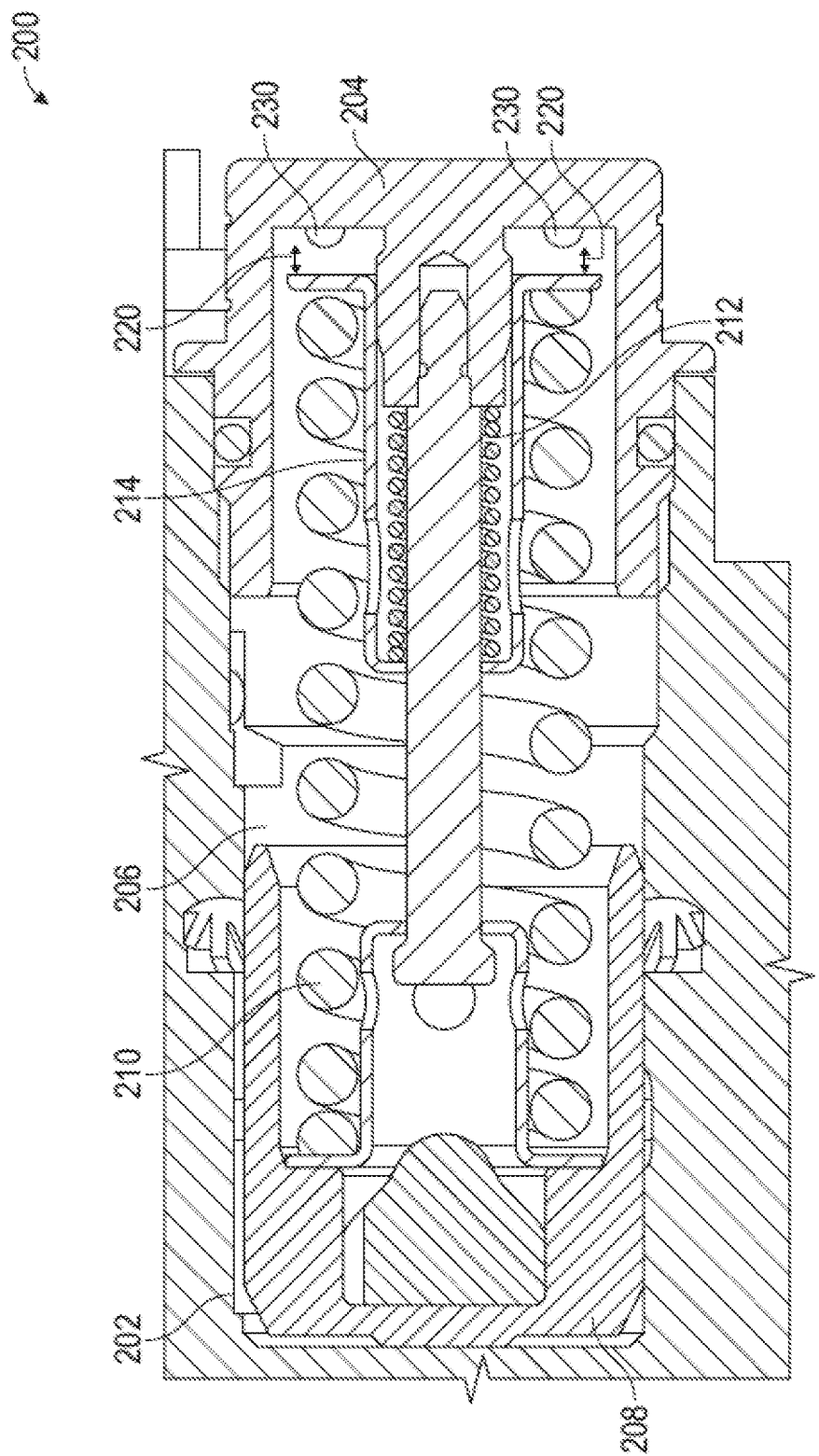
FIG. 3 is a view illustrating a pedal simulator device in an initial pedal simulator state according to a second exemplary embodiment of the present invention.

FIG. 3 is a view illustrating a pedal simulator 200 according to a second exemplary embodiment of the present invention. As shown in FIG. 3, the pedal simulator 200 provides brake pedal 12 feeling for the driver of a vehicle via a reactionary force provided by the pedal simulator 200. The pedal simulator 200 is formed with an aperture (not shown) to allow for the inflow of brake fluid from the master cylinder to pressurize a portion of the pedal simulator 200.

The pedal simulator 200 is generally housed within a bore 202 enclosed by a simulator cap 204, defining an enclosure 206. However, it is within the scope of the invention that the enclosure 206 of the pedal simulator 200 may be formed from a housing, container, or other space configured to house the components of the pedal simulator. At least a portion of the enclosure 206 will be pressurized via brake fluid coming from the master cylinder. Pressurization of a least a portion of the enclosure 206 will cause movement of a plunger portion 208 of the pedal simulator 200. One or more biased elements, such as a first reaction spring 210 and a second reaction spring 212, oppose movement of the plunger portion 208 In the illustrated embodiment, the first reaction spring 210 is located between the plunger portion 208 and a spring retainer 214, while the second reaction spring 212 is located between the spring retainer 214 and the simulator cap 204. The biased forced created by the first 210 and second 212 reaction springs produce the reactionary force to the driver pressing on the brake pedal 12, in the manner described below.

Hydraulic pressure is increased in the pedal simulator 200 by the driver advancing the brake pedal 12, which in turn causes the master cylinder to force additional brake fluid into the pedal simulator. As such, the plunger portion 208 moves laterally in the pedal simulator 200. As the plunger portion 208 moves laterally, the first reaction spring 210 is also moved laterally which in turn moves the spring retainer 214. As shown in FIG. 3, a gap 220 is provided between the spring retainer 214 and the simulator cap 204. The gap 220 allows an initial movement of the spring retainer 214 relative to the simulator cap 204. Thus, the initial movement of the spring retainer 214 forces compression of the second reaction spring 212 between the spring retainer 214 and the simulator cap 204. Compression of the second reaction spring 212 will continue until the spring retainer 214 advances far enough laterally in the pedal simulator 200 to overcome the gap 220 and abut the simulator cap 204.

As shown in FIG. 3, a gap protrusion 230 is located on simulator cap 204. As shown in the embodiment of FIG. 3, the gap protrusion 230 is located on the bottom of the simulator cap 204. The gap protrusion 230 also defines the surface closest to the spring retainer 214, and thus will be the first surface to come into contact with the spring retainer 214.

In the embodiment shown in FIG. 3, the gap protrusion 230 is integrally formed with the simulator cap 204. However, it is within the scope of the invention that the gap protrusion 230 could be formed as a separate component or could be secured to the simulator cap 204 or formed on any portion of the pedal simulator 200 that forms a portion of the enclosure and contacts the spring retainer 214. In the embodiment shown in FIG. 3, the gap protrusion 230 is formed from metal in the shape of a dome, but could be made of any desired material or formed in any desired shape. Further, it is within the scope of the invention that the gap protrusion 230 can be made in a variety of ways from the simulator cap 204. For example, the gap protrusion 230 can be formed by a stamping operation performed on the simulator cap 204, such that the stamping operation deforms a portion of the simulator cap 204 to protrude from the remainder of the spring retainer. It is also within the scope of the invention that the gap protrusion 230 could be formed from casting or a machining operation. In addition to the gap protrusion 230 having a variety of shapes, the gap protrusion 230 can be formed as a continuous ring around the simulator cap 204, or formed as a plurality of individual protrusions spaced around the simulator cap 204. Further, the gap protrusion 230 could be any continuous shape, for example a square, triangle, circle, oval, or any polygon or can have individual protrusions of any shape or any combination of shapes.

With a gap protrusion 230 located on the simulator cap 204, in the embodiment shown in FIG. 3, the gap protrusion 230 will have an initial height from its formation process. In order to adjust the pedal feeling by changing the dimensions of the gap 220, as described above, the height of the gap protrusion 230 can be adjusted to change the distance between the simulator cap 204 and the spring retainer 214, via the outermost surface of the gap protrusion 230. In the preferred embodiment, the gap protrusion 230 is set to a specific height via a crushing operation that deforms the gap protrusion 230 to the desired height. However, it is within the scope of the invention that the height of the gap protrusion 230 can be adjusted via any method such as a machining or cutting operation.

It is another aspect of the invention that gap protrusion 130 or 230 can be utilized to adjust for dimensional tolerances of other components in the pedal simulator 100 or 200. For example, each individual component could have a small dimensional tolerance that together add up to a value that would have a significant effect on the size of the gap 120 or 220. An individual pedal simulator 100 or 200 could have several components at the outermost range of each individual tolerance, but resulted in an unacceptable pedal response. Thus, being able to account for these individual tolerances before final assembly would result in an improved final gap 120 or 220 dimension and reduce the number of pedal simulators 100 or 200 failing quality control measures.

Figure 5A:
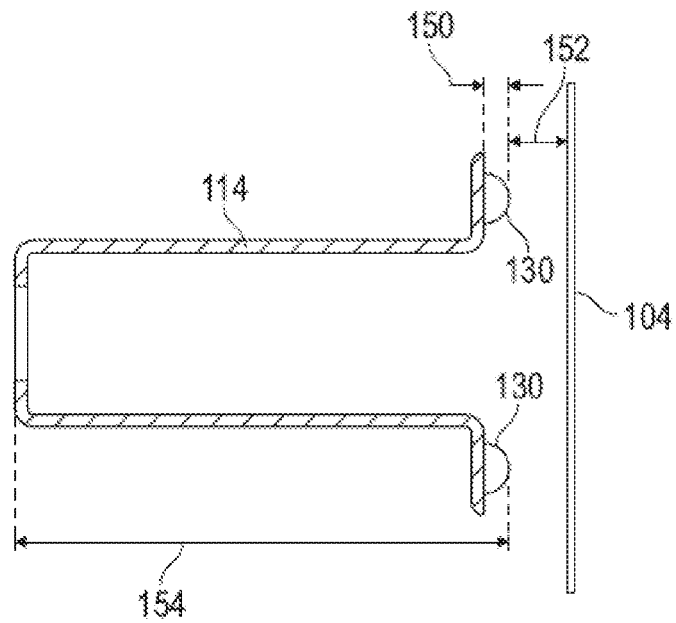
FIGS. 5A and 5B illustrate a deforming operation of a portion of the pedal simulator device.
Figure 5B:
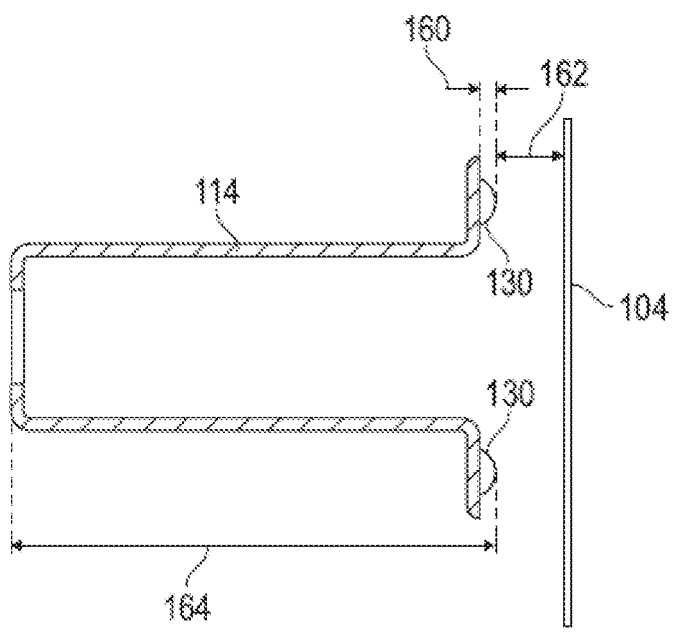

For example, each individual component of a single pedal simulator 100 or 200 could be measured before final assembly including an initial height 150 of the gap protrusion 130. As best shown in FIG. 5A and FIG. 5B, the individual dimensions would then be calculated to determine an estimated gap dimension 152, as result of the initial axial length 154 of the respective component that defines the transition point between the initial pedal travel 300 and onset braking 304. The estimated gap dimension 152 would then be compared to a desired gap dimension 162 to determine a gap protrusion 130 adjustment or gap protrusion final height 160, corresponding to a desired axial length 164 of the respective component of the pedal simulator 100. A crushing or machining operation of the gap protrusion 130, that would form the gap protrusion 130 in accordance with the gap protrusion adjustment to achieve a gap protrusion 130 final height 160. Final assembly of the pedal simulator 100 would take place with the gap protrusion 130 adjusted for that specific assembly. As a result of the crushing operation, the onset braking point of the initial axial length 154 is changed to the desired axial length 164 corresponding to the desired onset braking transition point 302.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A pedal simulator, comprising:
an enclosure housing a first reaction member and a reaction member retainer between a first portion of the enclosure and a second portion of the enclosure;
wherein the reaction member retainer is configured to be spaced from the second portion of the enclosure to form a gap, in an initial pedal simulator state;
wherein the reaction member retainer is configured to move laterally relative to the second portion of the enclosure to close the gap, the reaction member retainer being configured to abut the second portion of the enclosure in an actuated pedal simulator state; and
wherein at least one of the reaction member retainer and the second portion of the enclosure has at least one gap protrusion, the at least one gap protrusion abutting the other of the at least one of the reaction member retainer and the second portion of the enclosure in the actuated pedal simulator state to prevent lateral movement of the reaction member retainer toward the second portion of the enclosure, a height of the at least one gap protrusion being adjustable to adjust the length of the gap, the height of the at least one gap protrusion being adjusted prior to use of the pedal simulator.

2. The pedal simulator according to claim 1, wherein the at least one gap protrusion is on the reaction member retainer, the at least one gap protrusion being spaced from the second portion of the enclosure by the gap in the initial pedal simulator state, the at least one gap protrusion engaging the second portion of the enclosure in the actuated pedal simulator state.

3. The pedal simulator according to claim 1, wherein the at least one gap protrusion is a plurality of gap protrusions.

4. The pedal simulator according to claim 1, wherein the height of the at least one gap protrusion is adjusted by being crushed.

5. The pedal simulator according to claim 1, wherein a second reaction member is located between the second portion of the enclosure and the reaction member retainer.

6. The pedal simulator according to claim 5, wherein the second reaction member is configured to be compressed before the pedal simulator is in the actuated pedal simulator state.

7. The pedal simulator according to claim 1, wherein the at least one gap protrusion is configured to be adjusted to a plurality of heights.

8. The pedal simulator according to claim 1, wherein the second portion of the enclosure is a pedal simulator cap.

9. A method of making a pedal simulator of a vehicle, the method comprising:
providing a reaction member retainer configured to be moved toward an engagement portion of an enclosure during use of the pedal simulator, the reaction member retainer having a deformable gap protrusion having an end surface which in part defines an initial axial length of the reaction member retainer, the initial axial length corresponding to an initial pedal travel distance that a brake pedal of the vehicle travels against a first reaction force before reaching an onset braking point, the brake pedal traveling against a greater second reaction force upon reaching the onset braking point;
determining a desired axial length for the reaction member retainer, the desired axial length corresponding to a desired pedal travel distance that the brake pedal travels against the bias of the first reaction force before reaching the onset braking point, the desired axial length being smaller than the initial axial length; and
deforming the deformable gap protrusion to reduce an axial length of the reaction member retainer from the initial axial length to the desired axial length prior to use of the pedal simulator.

10. The method of forming a pedal simulator of claim 9, wherein the deforming is performed via a crushing operation.

11. A method of making a pedal simulator, comprising:
providing a reaction member retainer and an enclosure for housing the reaction member retainer, the reaction member retainer being configured to be moved toward an engagement portion of the enclosure during use of the pedal simulator, at least one of the reaction member retainer and the engagement portion having a gap protrusion with an initial height;
determining the initial height of the gap protrusion;
calculating an expected gap distance between the gap protrusion and the engagement portion of the enclosure in the pedal simulator based on at least the initial height of the gap protrusion;
calculating the difference between the expected gap distance and a desired gap distance between the gap protrusion and the engagement portion of the enclosure to determine a final height of the gap protrusion that corresponds to the desired gap distance; and
deforming the gap protrusion from the initial height to the final height prior to use of the pedal simulator.

12. The method of forming a pedal simulator of claim 11, wherein the gap protrusion is formed on the reaction member retainer of the pedal simulator.

13. The method of forming a pedal simulator of claim 11, wherein the gap protrusion is formed on the engagement portion of the enclosure, the engagement portion being on a simulator cap of the pedal simulator.

14. The method of forming a pedal simulator of claim 11, wherein deforming the gap protrusion is performed via a crushing operation.

15. The method of forming a pedal simulator according to claim 11, wherein the expected gap distance corresponds to an initial pedal travel distance that a brake pedal of a vehicle travels against a first reaction force before reaching an onset braking point, the brake pedal traveling against a greater second reaction force upon reaching the onset braking point, the desired gap distance corresponding to a desired pedal travel distance that the brake pedal travels against the first reaction force before reaching the onset braking point.

16. The pedal simulator according to claim 1, wherein pressure in at least a portion of the enclosure is configured to cause the first reaction member to compress only after the reaction member retainer abuts the second portion of the enclosure.

17. The pedal simulator according to claim 1, wherein the at least one gap protrusion is formed from metal.

18. The pedal simulator according to claim 1, wherein prior to use of the pedal simulator, the at least one gap protrusion is formed having an initial height that corresponds to an initial lateral length of the gap, and the at least one gap protrusion is adjusted from having the initial height to having a final height that corresponds to a desired lateral length of the gap.

19. The pedal simulator according to claim 1, wherein the at least one gap protrusion is on the second portion of the enclosure, the at least one gap protrusion being spaced from the reaction member retainer by the gap in the initial pedal simulator state, the at least one gap protrusion engaging the reaction member retainer in the actuated pedal simulator state.

* * * * *